United States Patent
Tsuchida et al.

(10) Patent No.: US 9,491,358 B2
(45) Date of Patent: Nov. 8, 2016

(54) IMAGING DEVICE FOR PERFORMING IMAGE PROCESSING BASED ON PHOTOGRAPHING DIRECTION

(71) Applicant: Panasonic Intellectual Property Management Co., Ltd., Osaka (JP)

(72) Inventors: Yukitaka Tsuchida, Osaka (JP); Yoshihiro Tomikura, Osaka (JP); Masahiro Yamada, Osaka (JP); Nao Kataoka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/562,811

(22) Filed: Dec. 8, 2014

(65) Prior Publication Data

US 2015/0181120 A1    Jun. 25, 2015

(30) Foreign Application Priority Data

Dec. 20, 2013 (JP) ................. 2013-263435
Nov. 25, 2014 (JP) ................. 2014-237352

(51) Int. Cl.
| | |
|---|---|
| *H04N 5/232* | (2006.01) |
| *H04N 9/73* | (2006.01) |
| *H04N 5/225* | (2006.01) |
| *H04N 5/235* | (2006.01) |
| *H04N 5/247* | (2006.01) |

(52) U.S. Cl.
CPC ........ *H04N 5/23245* (2013.01); *H04N 5/2258* (2013.01); *H04N 5/235* (2013.01); *H04N 5/23229* (2013.01); *H04N 5/247* (2013.01); *H04N 9/735* (2013.01)

(58) Field of Classification Search
CPC ........... H04N 5/2258; H04N 5/23293; H04N 5/232; H04N 5/23245; H04N 5/225
See application file for complete search history.

(56) References Cited

U.S. PATENT DOCUMENTS

| | | | |
|---|---|---|---|
| 2003/0016214 A1 | 1/2003 | Sukeno et al. | |
| 2003/0026607 A1* | 2/2003 | Okisu | H04N 5/23245 396/213 |
| 2003/0026611 A1* | 2/2003 | Cho | G03B 41/00 396/332 |
| 2003/0071908 A1* | 4/2003 | Sannoh | H04N 5/23212 348/345 |
| 2003/0117501 A1 | 6/2003 | Shirakawa | |
| 2003/0156206 A1* | 8/2003 | Ikeda | H04N 9/73 348/223.1 |
| 2004/0105012 A1* | 6/2004 | Lee | G06T 1/20 348/220.1 |
| 2004/0212709 A1* | 10/2004 | Lee | H04N 5/2251 348/333.01 |
| 2008/0194290 A1* | 8/2008 | Lebert | G01D 5/145 455/556.1 |
| 2010/0026835 A1 | 2/2010 | Negishi et al. | |

(Continued)

FOREIGN PATENT DOCUMENTS

| | | |
|---|---|---|
| JP | 11-112860 | 4/1999 |
| JP | 2003-032542 | 1/2003 |

(Continued)

*Primary Examiner* — Abdelaaziz Tissire
(74) *Attorney, Agent, or Firm* — Wenderoth, Lind & Ponack, L.L.P.

(57) ABSTRACT

An imaging device according to the present disclosure includes: an axially rotatable imaging unit; a detector that detects a photographing direction of the imaging unit; a processor that performs image processing on image data generated by the imaging unit; and a controller that changes a setting method of an image processing parameter depending on the photographing direction detected by the detector, the image processing parameter being given to the image data by the processor.

10 Claims, 8 Drawing Sheets

(56) References Cited

U.S. PATENT DOCUMENTS

2013/0100254 A1* 4/2013 Morioka ............ H04N 13/0025
348/47
2013/0265311 A1* 10/2013 Na ............................ G06T 3/40
345/428
2015/0163409 A1* 6/2015 Sakai ................. H04N 5/23293
348/333.03

FOREIGN PATENT DOCUMENTS

| JP | 2003-189168 | 7/2003 |
|----|-------------|--------|
| JP | 2004-236287 | 8/2004 |
| JP | 2004-282296 | 10/2004 |
| JP | 2007-184887 | 7/2007 |
| JP | 2007-336107 | 12/2007 |
| JP | 2010-154426 | 7/2010 |

* cited by examiner

FIG. 1A

(State 1)

FIG. 1B

(State 2)

FIG. 2A

(State 1)

FIG. 2B

(State 2)

FIG. 3A (State 1)

FIG. 3B (State 2)

| 5 | 4 | 4 | 4 | 4 | 4 | 4 | 4 | 5 |
|---|---|---|---|---|---|---|---|---|
| 4 | 3 | 2 | 1 | 1 | 1 | 2 | 3 | 4 |
| 4 | 3 | 2 | 1 | 1 | 1 | 2 | 3 | 4 |
| 4 | 3 | 2 | 1 | 1 | 1 | 2 | 3 | 4 |
| 4 | 3 | 2 | 1 | 1 | 1 | 2 | 3 | 4 |
| 5 | 4 | 4 | 4 | 4 | 4 | 4 | 4 | 5 |

(AE correction 1)

FIG. 8B

| 3 | 3 | 3 | 3 | 3 | 3 | 3 | 3 | 3 |
|---|---|---|---|---|---|---|---|---|
| 3 | 3 | 3 | 3 | 3 | 3 | 3 | 3 | 3 |
| 3 | 3 | 3 | 3 | 3 | 3 | 3 | 3 | 3 |
| 3 | 3 | 3 | 3 | 3 | 3 | 3 | 3 | 3 |
| 3 | 3 | 3 | 3 | 3 | 3 | 3 | 3 | 3 |
| 3 | 3 | 3 | 3 | 3 | 3 | 3 | 3 | 3 |

(AE correction 2)

IMAGING DEVICE FOR PERFORMING IMAGE PROCESSING BASED ON PHOTOGRAPHING DIRECTION

BACKGROUND

1. Technical Field

The present disclosure relates to an imaging device.

2. Description of the Related Art

A digital camera as shown in PTL 1 can photograph a scene, which is viewed by a photographer, in a format such as a still image and a moving image. In recent years, the digital camera has been variously developed, and a degree of satisfaction of users has been increased more and more.

CITATION LIST

Patent Literature

PTL 1: Unexamined Japanese Patent Publication No. 2010-154426

As an example of a camera form which has developed from the conventional digital camera, there is assumed a camera form in which a camera unit as an imaging unit is axially rotatable with respect to a main body. The camera unit axially rotates with respect to the main body, whereby a degree of freedom in a photographing direction is increased as compared to the conventional digital camera. Meanwhile, in photographing, it is desired that an image is photographed with quality suitable for a scene. Hence, it has also become necessary that the image quality matches with the increase of the degree of freedom in the photographing direction.

SUMMARY

In order to solve the above-described problem, an imaging device according to the present disclosure includes: an axially rotatable imaging unit; a detector that detects a photographing direction of the imaging unit; a processor that performs image processing on image data generated by the imaging unit; and a controller that changes a setting method of an image processing parameter depending on the photographing direction detected by the detector, the image processing parameter being given to the image data by the processor.

Moreover, the imaging device according to the present disclosure includes a first imaging unit that captures an image of a subject and generates first image data. The imaging device includes a second imaging unit that generates second image data of the subject which is different from the first image data, the second imaging unit being attached so that a photographing direction of the second imaging unit is rotatable with respect to the first imaging unit. The imaging device includes a detector that detects the photographing direction of the second imaging unit, and a processor that performs image processing on each of the first image data and the second image data generated by the first imaging unit and the second imaging unit. The imaging device includes a controller that changes a setting method of an image processing parameter depending on the photographing direction detected by the detector, the image processing parameter being given to the second image data by the processor.

The present disclosure provides an imaging device capable of performing suitable image processing on the subject photographed by the rotationally movable imaging unit.

DETAILED DESCRIPTION

A description is made below in detail of an exemplary embodiment while referring to the drawings as appropriate. However, a description in more detail than necessary may be omitted. For example, a detailed description of a well-known matter and a duplicate description of substantially the same configuration may be omitted. These omissions are made in order to avoid unnecessary redundancy of the following description and to facilitate the understanding of those skilled in the art.

Note that the inventors provide the accompanying drawings and the following description in order to allow those skilled in the art to fully understand the present disclosure, and do not intend to thereby limit the subject matters described in the claims.

First Exemplary Embodiment

1. Outline

Figure 1A:
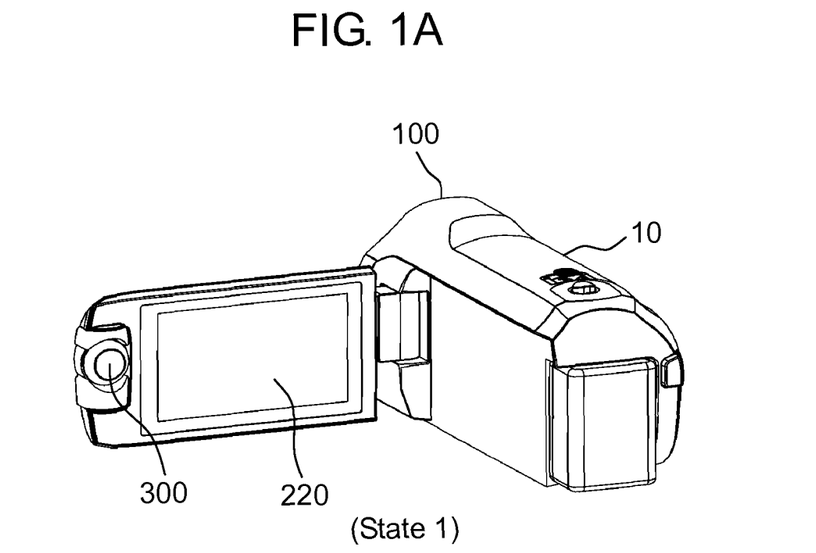
FIG. 1A is a perspective view showing an outline of an imaging device according to an exemplary embodiment (State 1)
Figure 1B:
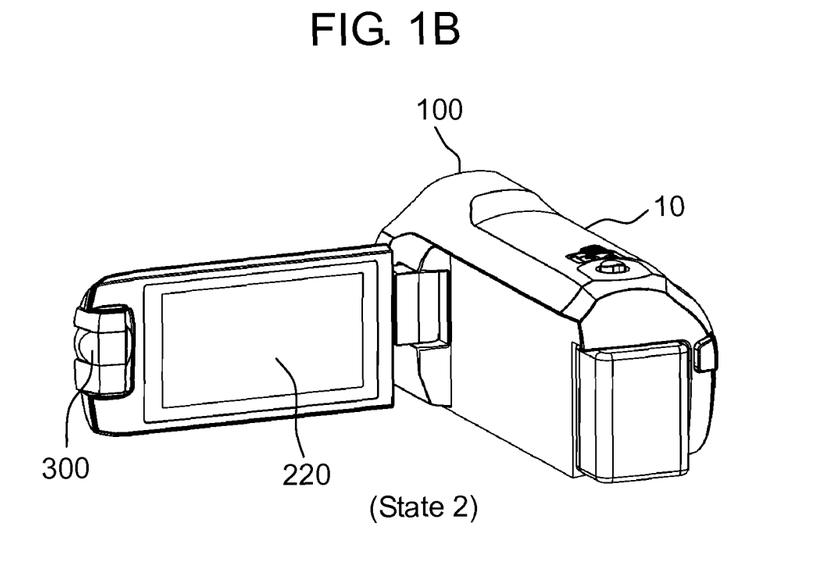
FIG. 1B is a perspective view showing the outline of the imaging device according to the exemplary embodiment (State 2)
Figure 2A:
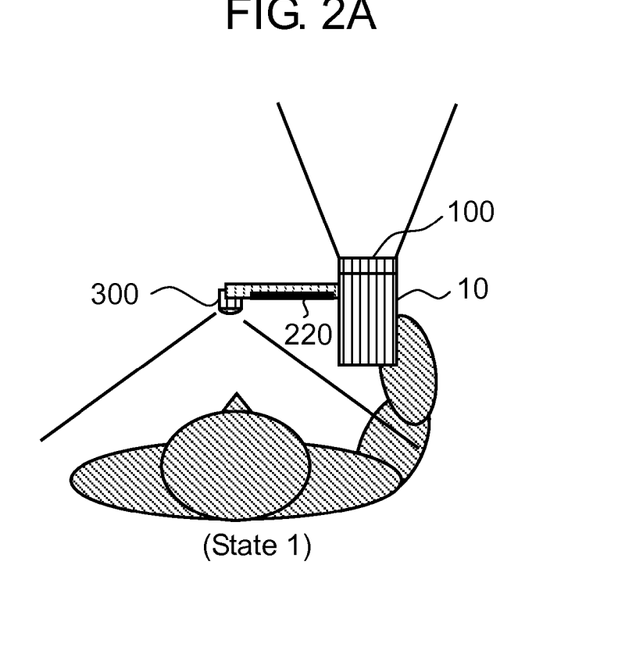
FIG. 2A is a view showing an example of using the imaging device according to the exemplary embodiment (State 1)
Figure 2B:
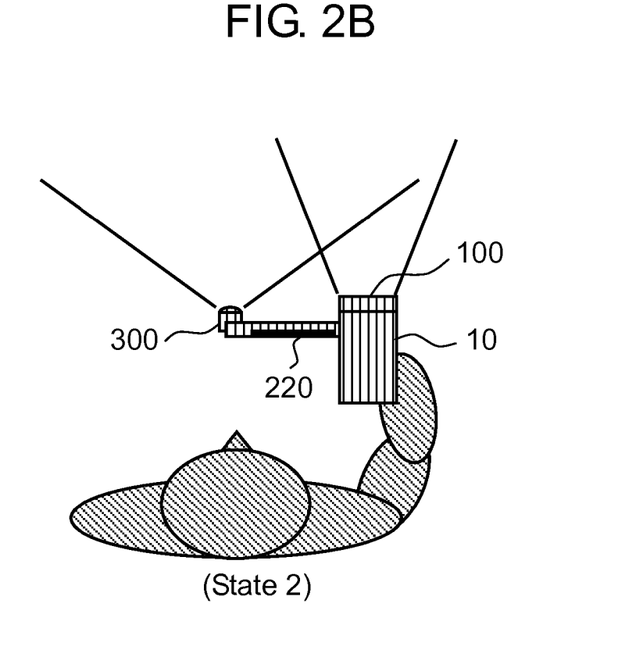
FIG. 2B is a view showing an example of using the imaging device according to the exemplary embodiment (State 2)
Figure 3A:
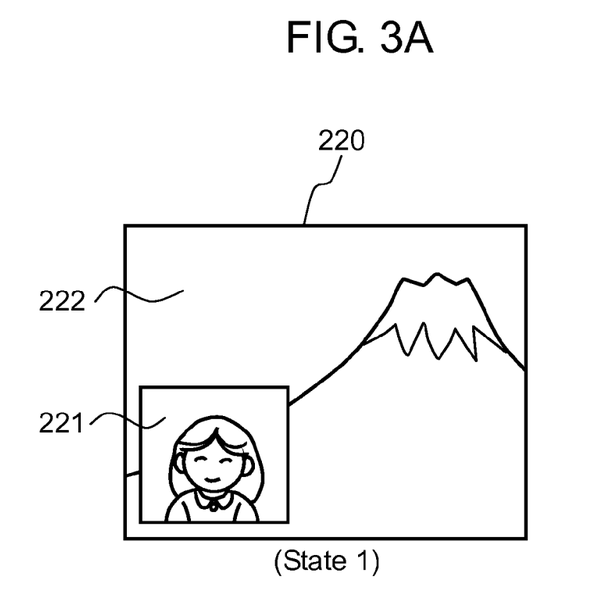
FIG. 3A is a view showing an example of images displayed on a display unit of the imaging device according to the exemplary embodiment (State 1)
Figure 3B:
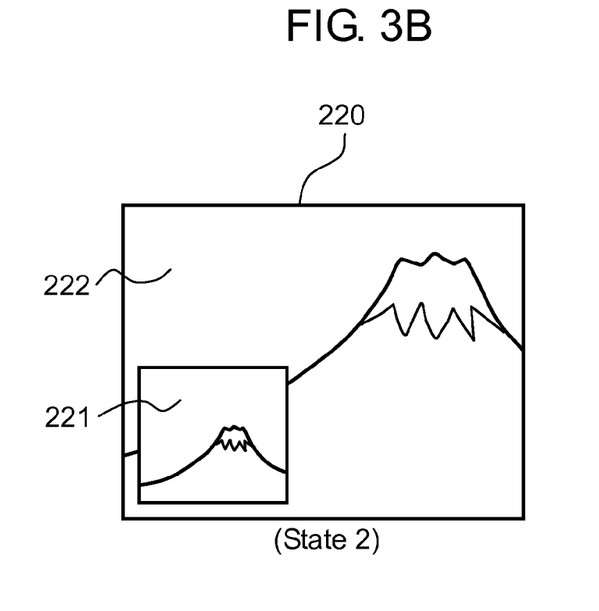
FIG. 3B is a view showing an example of the images displayed on the display unit of the imaging device according to the exemplary embodiment (State 2)

First, a description is made below of an outline of imaging device 10 with reference to the drawings. FIG. 1A and FIG. 1B are perspective views showing the outline of imaging device 10. FIG. 2A and FIG. 2B are views showing examples of using imaging device 10. FIG. 3A and FIG. 3B are views showing examples of images displayed on display unit 220 of imaging device 10. FIG. 1A, FIG. 2A, and FIG. 3A are views corresponding to states where sub-camera 300 is in State 1, and FIG. 1B, FIG. 2B, and FIG. 3B are views corresponding to states where sub-camera 300 is in State 2.

As shown in FIG. 1A, FIG. 1B, FIG. 2A, and FIG. 2B, imaging device 10 includes main camera 100, display unit 220, and sub-camera 300. Main camera 100 is disposed on a main body of imaging device 10. Display unit 220 is joined to the main body of imaging device 10 so as to be biaxially rotatable about a hinge portion. Sub-camera 300 is attached onto display unit 220 so as to be axially rotatable. Main camera 100 captures an image of a subject which a photographer mainly desires to photograph. Sub-camera 300 is rotationally movable with respect to main camera 100, so that an image of a subject in a photographing direction different from that of main camera 100 can be captured. As shown in FIG. 3A and FIG. 3B, display unit 220 displays PinP (Picture in Picture) images, in each of which an image captured by sub-camera 300 is superimposed on an image captured by main camera 100. In the following, for convenience of the explanation, the image photographed by main camera 100 is referred to as main image 222, and the image photographed by sub-camera 300 is referred to as sub-image 221. Main camera 100 and sub-camera 300 are examples of an imaging unit.

Next, a description is made of the examples of using imaging device 10 with reference to FIG. 2A and FIG. 2B. As shown in FIG. 2A and FIG. 2B, at the time of normal use, the photographer uses imaging device 10 so that the photographing direction of main camera 100 can be directed to a front direction of the photographer. At this time, the photographer rotationally moves display unit 220, and sets display unit 220 in a state where the image displayed on display unit 220 can be checked. Sub-camera 300 rotationally moves axially, and is thereby capable of realizing a state (State 1) as shown in FIG. 2A, where the photographing direction is directed to the photographer side. Also, sub-camera 300 rotationally moves axially, and is thereby capable of realizing a state (State 2) as shown in FIG. 2B, where the photographing direction is not directed to the photographer side.

Note that a state of sub-camera 300 when the photographing direction of sub-camera 300 is directed to display unit 220 is assumed to be a state (hereinafter, a storage state) where sub-camera 300 is stored.

In this exemplary embodiment, when sub-camera 300 is in State 1, sub-camera 300 photographs the photographer. In contrast, in this exemplary embodiment, when sub-camera 300 is in State 2, sub-camera 300 photographs a subject similar to the subject photographed by main camera 100. Since the subjects are different between State 1 and State 2 of sub-camera 300, imaging device 10 performs different pieces of image processing between State 1 and State 2.

2. Electrical Configuration

Subsequently, a description is made of electrical configurations, control system, and image processing of main camera 100 and sub-camera 300 of imaging device 10 with reference to FIG. 4.

2-1. Electrical Configuration of Main Camera

Figure 4:
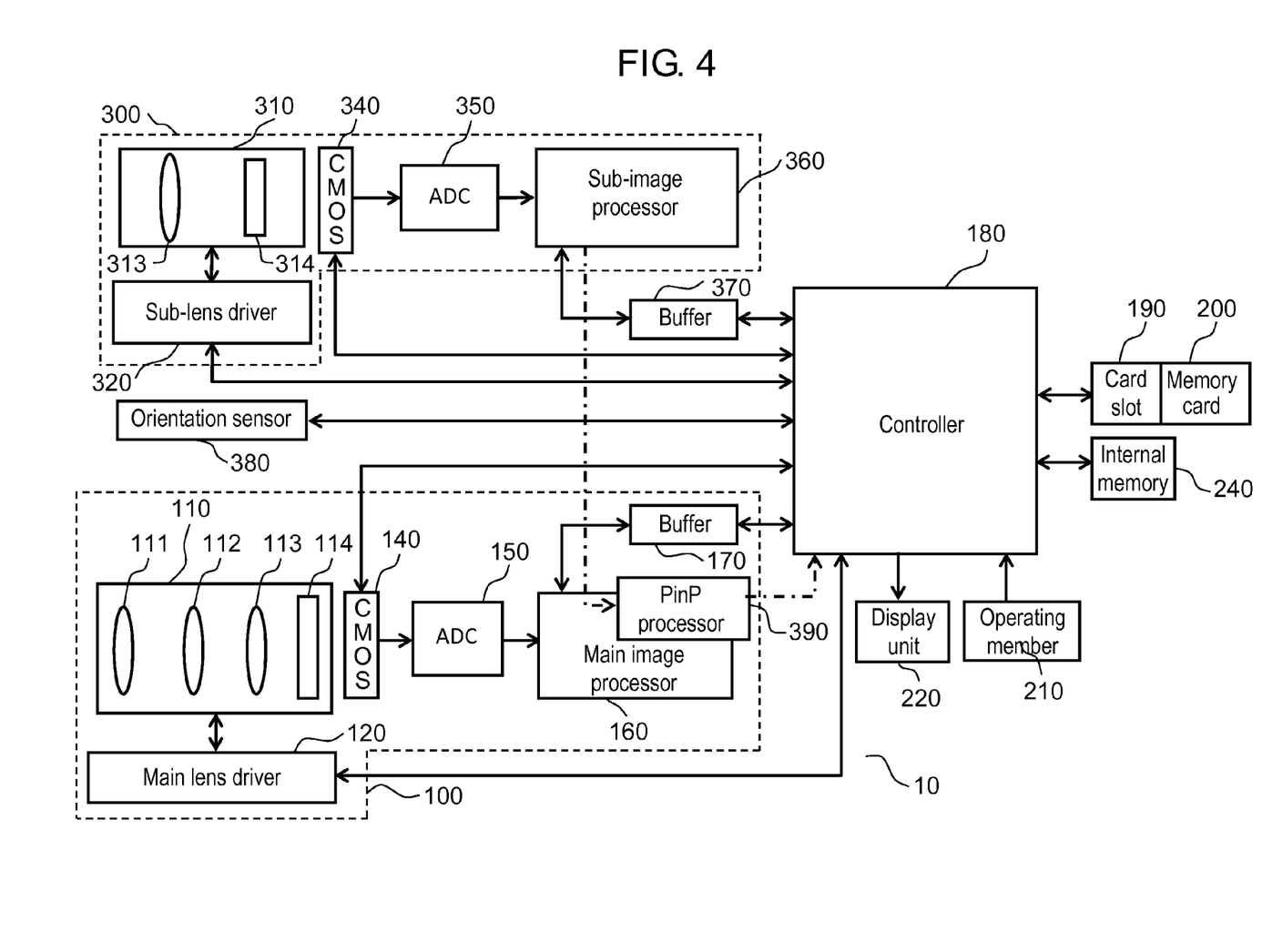
FIG. 4 is a view showing an electrical configuration of the imaging device according to the exemplary embodiment.

First, a description is made of the electrical configuration of main camera 100 with reference to FIG. 4. Main camera 100 captures a subject image, which is formed by main optical system 110 including one or more lenses, by CMOS image sensor 140. Image data generated by CMOS image sensor 140 is converted into a digital signal by A/D converter (ADC) 150, is then subjected to a variety of processing by main image processor 160, and is stored in memory card 200, or is displayed on display unit 220.

Main optical system 110 is configured by zoom lens 111, shake correction lens 112, focus lens 113, aperture 114, and the like. Zoom lens 111 is moved along an optical axis, thus making it possible to enlarge and reduce the subject image. Moreover, focus lens 113 is moved along the optical axis, thus making it possible to adjust a focus on the subject image. Moreover, shake correction lens 112 is movable in a plane perpendicular to the optical axis of main optical system 110. Shake correction lens 112 is moved in a direction of canceling a shake of imaging device 10, and can thereby reduce an influence given to a captured image by the shake of imaging device 10. Moreover, aperture 114 adjusts a size of an opening automatically or according to setting by a user, and adjusts an amount of transmitting light.

Main lens driver 120 includes actuators which individually drive zoom lens 111, shake correction lens 112, focus lens 113, and aperture 114. Then, for example, main lens driver 120 controls the respective actuators.

CMOS image sensor 140 captures the subject image formed by main optical system 110, and generates the image data. CMOS image sensor 140 performs a variety of operations such as exposure, transfer, and electronic shutter.

A/D converter 150 converts the analog image data, which is generated by CMOS image sensor 140, into digital image data.

Main image processor 160 performs a variety of processing on the image data generated by CMOS image sensor 140, and generates image data to be displayed on display unit 220. Moreover, main image processor 160 generates image data to be stored in memory card 200. For example, main image processor 160 performs a variety of processing, such as a gamma correction, a white balance (WB) correction, a sharpness correction, and a flaw correction, on the image data generated by CMOS image sensor 140. Moreover, main image processor 160 compresses the image data, which is generated by CMOS image sensor 140, according to a compression format in conformity with the H.264 standard or the MPEG2 standard, or the like.

In this exemplary embodiment, PinP processor 390 is incorporated in main image processor 160. FIG. 3A and FIG. 3B are examples of images, which are subjected to superimposition processing by PinP processor 390 and are displayed on display unit 220. PinP processor 390 performs the superimposition processing (PinP processing) of superimposing each of sub-images 221 onto main image 222. With regard to sub-image 221 subjected to the PinP processing, a position and size thereof can be changed in a through image displayed on display unit 220. At this time, it is desired that the PinP processing be performed so that main image 222 is larger than sub-image 221.

2-2. Electrical Configuration of Sub-Camera

Next, a description is made of an electrical configuration of sub-camera 300 with reference to FIG. 4. Sub-camera 300 captures a subject image, which is formed by sub-optical system 310 including one or more lenses, by CMOS image sensor 340. Image data generated by CMOS image sensor 340 is converted into a digital signal by A/D converter (ADC) 350, is then subjected to a variety of processing by sub-image processor 360, and is stored in memory card 200, or is displayed on display unit 220.

Sub-optical system 310 is configured by focus lens 313, aperture 314, and the like. It is assumed that configurations of the respective elements are the same as those provided in main camera 100, and detailed descriptions thereof are omitted. Note that types of the elements which constitute sub-optical system 310 of sub-camera 300 are not limited to focus lens 313 and aperture 314, and sub-optical system 310 may include a zoom lens, a shake correction lens, and the like.

It is assumed that main configurations of sub-lens driver 320, CMOS image sensor 340, A/D converter 350, and sub-image processor 360, which are included in sub-camera 300, are the same as those of main lens driver 120, CMOS image sensor 140, A/D converter 150, and main image processor 160, which are included in main camera 100. Thus, detailed descriptions thereof are omitted. Note that, in a case of using a fixed-focus optical system as sub-optical system 310 of sub-camera 300, sub-lens driver 320 does not have to be provided.

2-3. Control System

Sub-image processor 360 sends the image data, which is subjected to the variety of processing, to PinP processor 390. Then, the image data subjected to the PinP processing is stored in memory card 200. Alternatively, the image data subjected to the PinP processing is displayed on display unit 220.

The image data subjected to the image processing and the PinP processing is sent to controller 180. Controller 180 is a control unit for controlling the entire imaging device 10. Controller 180 can be realized by a semiconductor element and the like. Controller 180 may be configured only of hardware, or may be realized by combining hardware and software with each other. Controller 180 can be realized by a microcomputer or the like.

Orientation sensor 380 detects the photographing direction of sub-camera 300. At this time, orientation sensor 380 at least detects whether sub-camera 300 is in State 1 or in State 2. Controller 180 is notified of a detection result by orientation sensor 380. In this way, controller 180 can grasp the photographing direction (State 1, State 2) when sub-camera 300 rotationally moves axially. Orientation sensor 380 can be realized by using a switching mechanism, a magnet, a variable resistor, and the like.

Buffers 170 and 370 function as work memories for main image processor 160, sub-image processor 360, and controller 180. For example, each of buffers 170 and 370 can be realized by a DRAM, a ferroelectric memory, or the like.

Card slot 190 detachably attaches memory card 200 thereto. Card slot 190 is mechanically and electrically connectable to memory card 200. Memory card 200 includes a flash memory, a ferroelectric memory, or the like in an inside thereof, and can store data of an image file and the like, which are generated by main image processor 160 and sub-image processor 360.

Internal memory 240 is configured by a flash memory, a ferroelectric memory, or the like. Internal memory 240 stores a control program for controlling the entire imaging device 10, and the like.

Operating member 210 collectively refers to user interfaces which receive operations from the user. Operating member 210 includes, for example, a cursor key, a decision button and the like, which receive the operations from the user. Moreover, operating member 210 also includes a moving image recording button, a moving image reproduction button, and the like. The moving image recording button receives instructions from the user to start/stop recording a moving image. The moving image reproduction button receives instructions from the user to start/stop reproducing data of the moving image. The moving image recording button is described below as a button that receives both of a moving image recording start instruction when the moving image is not recorded and a moving image recording stop instruction when the moving image is recorded; however, the moving image recording button is not limited thereto. A moving image recording stop button may be provided separately from the moving image recording start button. The moving image recording button and the like may be hard keys provided on an exterior of imaging device 10. Moreover, the moving image recording button and the like may be soft keys which allow the user to operate, through a touch panel, button icons displayed on display unit 220.

Display unit 220 can display an image, which is indicated by the image data generated by CMOS image sensor 140, an image obtained by the superimposition processing of PinP processor 390, and an image indicated by the image data read out of memory card 200. Moreover, display unit 220 can also display a screen of various menus for performing a variety of setting of imaging device 10, and the like.

Note that, in FIG. 4, PinP processor 390 is illustrated so as to be incorporated in main image processor 160. However, the present disclosure is not limited thereto. PinP processor 390 may be incorporated in sub-image processor 360, or may be provided independently.

Moreover, the image data sent from sub-image processor 360 to PinP processor 390 may pass through buffer 370. In this way, the image data of sub-image 221 is temporarily stored in buffer 370, and accordingly, it becomes possible to send the image data of main image 222 and the image data of sub-image 221 to controller 180 at the same timing.

Moreover, it is assumed that two buffers are provided, i.e., buffer 170 that serves as the work memory for main camera 100; and buffer 370 that serves as the work memory for sub-camera 300; however, the present disclosure is not limited thereto. One buffer may be provided, or three or more buffers may be provided.

2-4. Image Processing

Subsequently, in the image processing performed by main image processor 160 and sub-image processor 360, a white balance correction, an exposure correction, and a sharpness correction are described as examples.

2-4-1. White Balance Correction

Figure 7A:
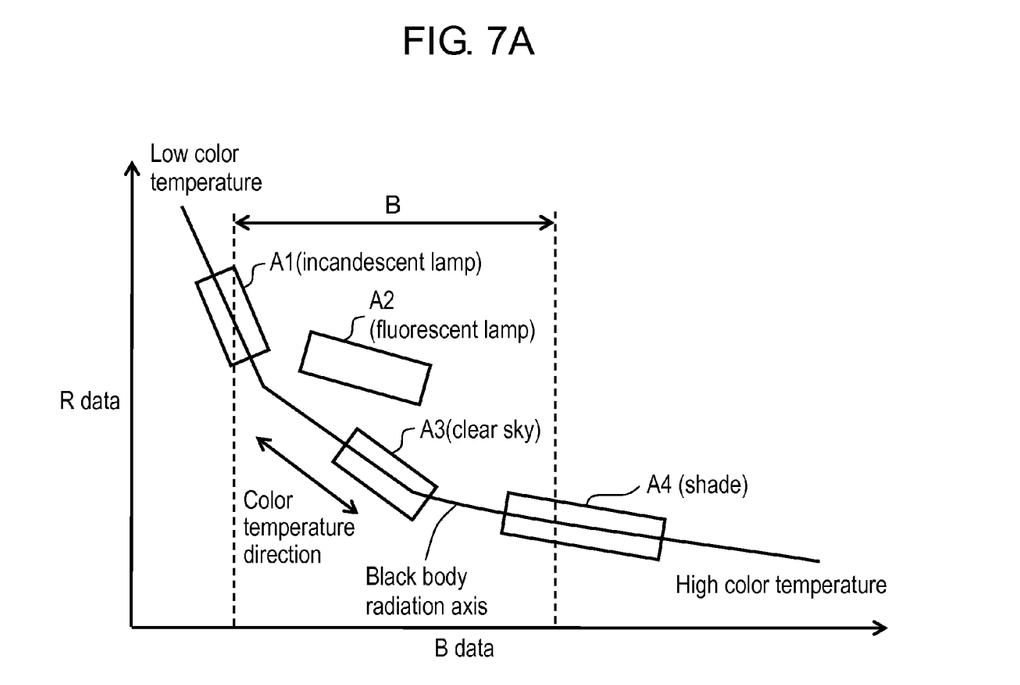
FIG. 7A is a view showing an outline of a white balance correction of the imaging device according to the exemplary embodiment.

First, a description is made of the white balance correction performed by each of main image processor 160 and sub-image processor 360. Each image processor of main camera 100 and sub-camera 300 adjusts a color tone of the image, and thereby corrects a white balance of the image data. Controller 180 estimates a light source from the image data. For example, as shown in FIG. 7A, a plurality of light source estimation ranges are set on coordinates of R data and B data. In an example shown in FIG. 7A, four light source estimation ranges A1 to A4, which are an incandescent lamp, a fluorescent lamp, a clear sky, and a shade, are set. A light source estimator of controller 180 can estimate a light source, taken as a reference for the white balance correction, based on which light source estimation range the input data of the image data ranges in. Each of main image processor 160 and sub-image processor 360 controls a tracking range of the white balance correction based on the light source estimated by the light source estimator. At this time, it is desirable that the tracking range be included in the light source estimation range. Each image processor adjusts an R gain, a B gain and a G gain in the tracking range of the white balance correction, and thereby adjusts the color tone of the image. For example, when the image is reddish, each image processor performs corrections, for example, reduces the R gain, and increases the B gain and the G gain. Note that details of the WB correction shown in FIG. 7A and FIG. 7B will be described later.

2-4-2. Exposure Correction

Next, a description is made of the exposure correction performed by each of main image processor 160 and sub-image processor 360. Each image processor adjusts brightness of the image, and thereby corrects exposure of the image data. Controller 180 determines the brightness of the image based on brightness information of the image data. At this time, a sight meter (not shown) may be used, or the obtained image data may be analyzed. In accordance with the brightness information obtained from the image data, each image processor corrects the exposure decreasingly in a case where the image is far brighter than a reference value of appropriate exposure (overexposure). Moreover, each image processor corrects the exposure increasingly in a case where the image is far darker than the reference value of the appropriate exposure (underexposure). By such corrections, the exposure of the image is corrected to the appropriate exposure. Methods for correcting the exposure include a method of adjusting apertures 114 and 314, and a method of adjusting a contrast value by each of main image processor 160 and sub-image processor 360. Moreover, as described below, in determining the appropriate exposure, a part of the image may be weighted by setting of the user, or the entire image may be treated on average.

2-4-3. Sharpness Correction

Finally, a description is made of the sharpness correction performed by each of main image processor 160 and sub-image processor 360. Each image processor adjusts a contrast of the image, and thereby corrects sharpness (clearness) of the image data. Controller 180 analyzes a brightness difference between the respective pixels of the image data. In a case of sharpening the image, each image processor emphasizes the brightness difference between the respective pixels of the image data. Moreover, in a case of softening the image, each image processor reduces the brightness difference between the respective pixels of the image data. In a case of capturing an image of a scene and the like, it is desirable to emphasize the brightness difference between the respective pixels of the image data in order to highlight the color of the image. Moreover, in a case of capturing an image of a person, it is desirable to reduce the brightness difference between the respective pixels of the image data in order to make shadows and wrinkles of the face inconspicuous.

3. Operations

Figure 5A:
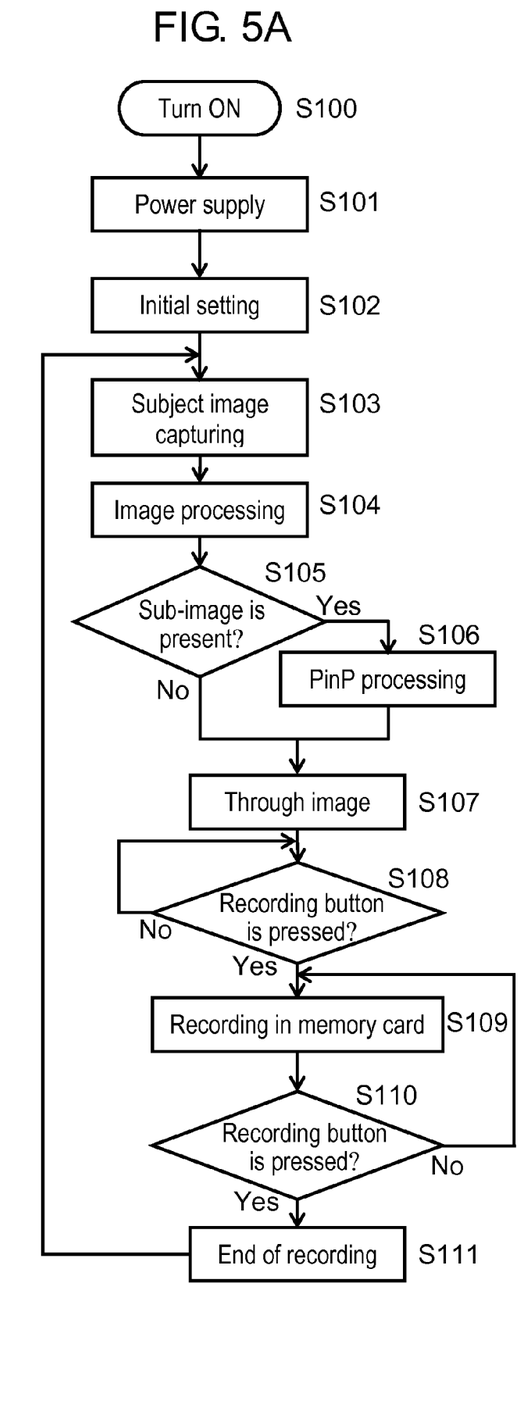
FIG. 5A is a flowchart showing photographing operations (main camera) of the imaging device according to the exemplary embodiment.
Figure 5B:
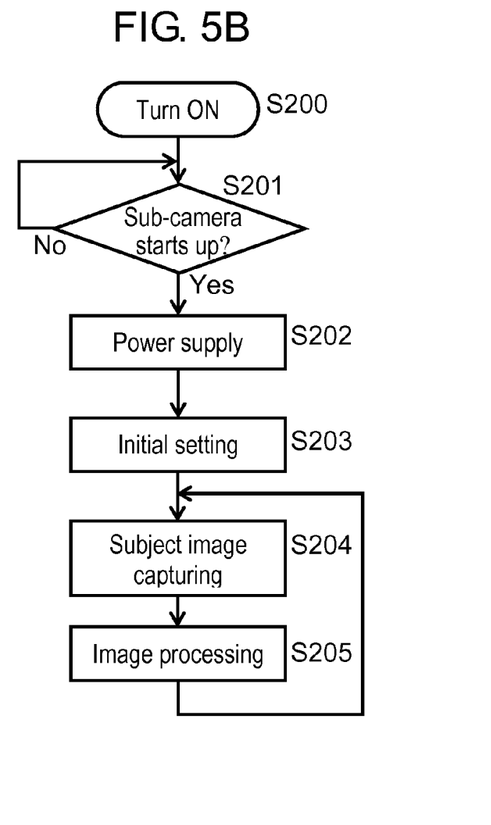
FIG. 5B is a flowchart showing photographing operations (sub-camera) of the imaging device according to the exemplary embodiment.

Subsequently, a description is made of operations of imaging device 10. FIG. 5A is a flowchart showing photographing operations of main camera 100, and FIG. 5B is a flowchart showing photographing operations of sub-camera 300.

3-1. Operations of Main Camera

First, a description is made of the operations of main camera 100 with reference to FIG. 5A. Note that, for simplification, it is assumed that imaging device 10 is set at an imaging mode.

When the power supply of imaging device 10 is turned ON (Step S100), controller 180 supplies necessary power to the respective units which constitute imaging device 10 (Step S101). Upon the supply of power, main lens driver 120 and CMOS image sensor 140 perform initial setting to operable states thereof (Step S102). Upon completion of the initial setting, CMOS image sensor 140 starts to capture the image of the subject (Step S103). The image data captured by CMOS image sensor 140 is sent to main image processor 160 (Step S104).

Here, controller 180 detects whether or not sub-image 221 is present (Step S105). In a case where sub-image 221 is not present (No in Step S105), display unit 220 starts to display the through image based on the image data generated by CMOS image sensor 140 (Step S107). At this time, the through image of main image 222 is displayed on display unit 220. While viewing the through image displayed on display unit 220, the user determines an angle of view and the like, and presses the moving image recording button of operating member 210 at timing suitable for the start of the moving image recording. In a case where sub-image 221 is present (Yes in Step S105), the PinP processing is performed (Step S106), and thereafter, the through image subjected to the PinP processing, which is shown in FIG. 3A or FIG. 3B, is displayed on display unit 220 (Step S107). The details will be described below together with the operations of sub-camera 300.

Controller 180 monitors whether or not the moving image recording button is pressed (Step S108). Controller 180 is on standby in a state of S108 until the moving image recording button is pressed. When the moving image recording button is pressed (Yes in Step S108), controller 180 starts to record, in memory card 200, the moving image data which is based on the image captured by CMOS image sensor 140 (Step S109). Before the moving image data is written into memory card 200, the moving image data may be temporarily accumulated in buffer 170. At this time, when a data amount of the moving image data accumulated in buffer 170 exceeds a fixed amount, controller 180 may write, into memory card 200, the moving image data having the data amount exceeding the fixed amount.

Here, controller 180 again monitors whether or not the moving image recording button is pressed (Step S110). Controller 180 continues to record the moving image data in a state of Step S110 until the moving image recording button is pressed. When the moving image recording button is pressed again (Yes in Step S110), controller 180 finishes recording the moving image data. Then, returning to Step S103, CMOS image sensor 140 captures the subject image again.

3-2. Operations of Sub-Camera

Next, a description is made of basic operations of sub-camera 300 and detailed operations of the image processing.

3-2-1. Basic Operations

First, a description is made of the basic operations of sub-camera 300 with reference to FIG. 5B. Here, for simplification, imaging device 10 is described to be already set to the photographing mode.

When the power supply of imaging device 10 is turned ON (Step S200), and controller 180 is supplied with power, then controller 180 always monitors whether or not sub-camera 300 has started up (Step S201). When the user starts up sub-camera 300 (Yes in Step S201), necessary power is supplied to the respective units which constitute sub-camera 300 (Step S202). At this time, when orientation sensor 380 senses the rotational movement of sub-camera 300 from its storage state, sub-camera 300 starts up. Note that a startup button that starts up sub-camera 300 may be provided, and sub-camera 300 may be started up by turning ON the startup button. Upon the supply of power, sub-lens driver 320 and CMOS image sensor 340 perform initial setting to operable states thereof (Step S203). Upon completion of the initial setting, CMOS image sensor 340 starts to capture the image of the subject (Step S204). The image data captured by CMOS image sensor 340 is sent to sub-image processor 360, and is subjected to the image processing (Step S205).

When the above-described operations are performed in sub-camera 300, then in Step S105 of FIG. 5A, it is determined that sub-image 221 is present (Yes in S105). After being subjected to the variety of processing by sub-image processor 360, sub-image 221 is subjected to the PinP processing in PinP processor 390 (Step S106). The image subjected to the PinP processing is displayed as the through image on display unit 220, in a state where main image 222 and sub-image 221 are superimposed on each other as shown in FIG. 3A or FIG. 3B (Step S107). Thereafter, recording operations (Step S108 to Step S111) are performed.

At the time of the recording operations, the respective superimposed images may be individually compressed and recorded as separate data. Alternatively, the respective images may be compressed and recorded as one piece of data.

As described above, sub-camera 300 can capture an image of a subject different from that of main camera 100 by moving rotationally. That is, sub-camera 300 at least has two states, i.e., State 1 in which the image of the photographer is likely to be captured, and State 2 in which the image of the photographer is less likely to be captured. Depending on each of State 1 and State 2, imaging device 10 in this exemplary embodiment uses different setting methods of an image processing parameter for the image captured by sub-camera 300.

Specifically, in State 1, sub-camera 300 is likely to capture the image of the photographer at a close distance. Therefore, sub-image processor 360 uses a setting method of the image processing parameter, which is different from that of the subject image captured by main camera 100. Meanwhile, in State 2, sub-camera 300 is likely to capture an image of a subject in a state close to main camera 100. Therefore, sub-image processor 360 uses a setting method of the image processing parameter, which is similar to that of main camera 100. A description is made below of the image processing (white balance correction, exposure correction, sharpness correction) in each of the states.

3-2-2. White Balance Correction

First, a description is made of the white balance correction. In imaging device 10, different types of the white balance correction can be performed for sub-image 221 depending on the states of sub-camera 300. The details will be described below with reference to FIG. 6A.

Figure 6A:
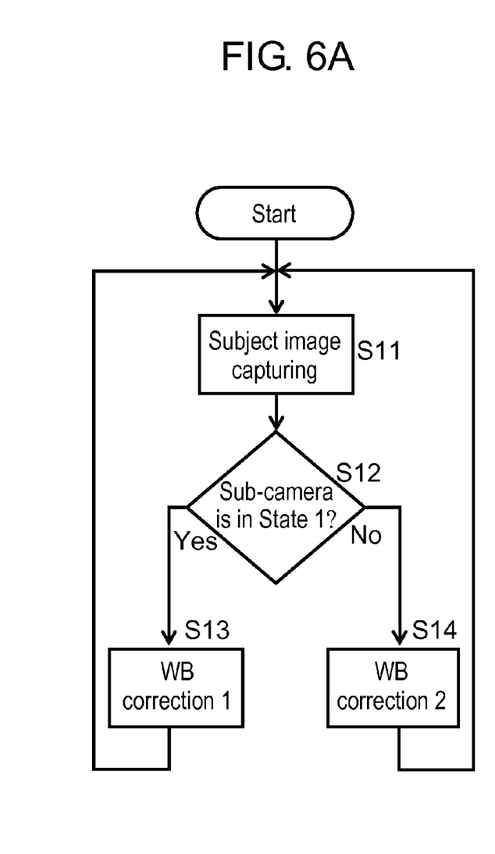
FIG. 6A is a flowchart showing image processing operations of the imaging device according to the exemplary embodiment (WB correction)

FIG. 6A is a flowchart showing image processing operations of the white balance correction in Step S205 shown in FIG. 5B. In Step S11 of FIG. 6A, CMOS image sensor 340 captures the subject image similarly to Step S204 of FIG. 5B. At the same time, sub-image processor 360 senses the state of sub-camera 300 (Step S12). In this embodiment, with regard to the sensing of the state, sub-image processor 360 may be configured to receive a detected value of orientation sensor 380 through controller 180; however, sub-image processor 360 may directly receive the detected value without passing the detected value through controller 180. When sub-camera 300 is in State 1 as a result of sensing the state of sub-camera 300 (Yes in Step S12), sub-image processor 360 performs WB correction 1 for the image data (Step S13). As described above, in State 1, sub-camera 300 is likely to capture the image of the photographer at a close distance, and accordingly, as WB correction 1, a WB correction which is suitable for the human face, that is, which prevents fading of a skin color is performed. When sub-camera 300 is in State 2 (No in Step S12), sub-image processor 360 performs WB correction 2, which corresponds to the WB correction for the image data generated by main camera 100, for the image data generated by sub-camera 300 (Step S14). Here, WB correction 2, which corresponds to the WB correction for the image data generated by main camera 100, may be a correction by the same parameter as a parameter of the WB correction for the image data generated by main camera 100. Alternatively, WB correction 2 may be a correction by a parameter obtained by multiplying, by a predetermined coefficient, the parameter of the WB correction for the image data generated by main camera 100.

Figure 7B:
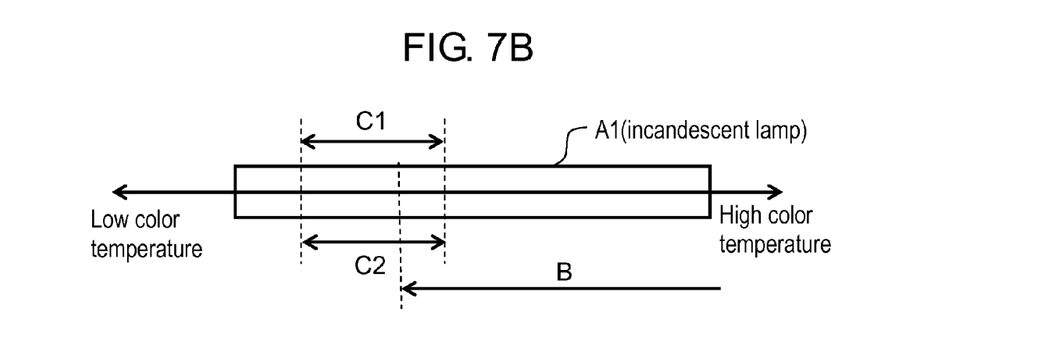
FIG. 7B is an enlarged view of the vicinity of a portion of light source estimation range A1 in FIG. 7A.

Here, WB correction 1 is described in detail. FIG. 7A is a view showing an outline of the WB correction, and shows the light source estimation ranges A1, A2, A3 and A4, which correspond to the incandescent lamp, the fluorescent lamp, the clear sky, and the shade as four main light sources, respectively. FIG. 7B is an enlarged view of the vicinity of light source estimation range A1 in FIG. 7A.

In WB correction 1, sub-image processor 360 operates independently of main image processor 160. Controller 180 estimates the light source based on the image data obtained from sub-camera 300, and notifies sub-image processor 360 of the tracking range of the WB correction. At this time, when sub-camera 300 captures the image of the photographer, controller 180 is likely to sense a large amount of the skin of the photographer and estimate the incandescent lamp as the light source. When the incandescent lamp is estimated as the light source, the WB correction is performed in a range of light source estimation range A1 shown in FIG. 7A. Then, due to the WB correction, sub-image 221 sometimes becomes a pale image that cancels redness of the skin of the photographer, that is, a so-called blue fog image. In other words, in this case, sub-image 221 becomes an image in which the skin color of the photographer has faded. However, in such an image, the skin color of the photographer cannot be expressed as appropriate, and it is conceived that the photographer feels dissatisfaction.

In this connection, in imaging device 10 according to this exemplary embodiment, when sub-camera 300 is in State 1, the range of the WB correction performed by sub-image processor 360 is limited as shown in FIG. 7A and FIG. 7B in order to appropriately reproduce the skin of the photographer. That is, the range of the WB correction performed by sub-image processor 360 is limited to tracking range B, whereby a limitation is imposed so that the WB correction cannot track a lower color temperature side (WB correction 1). By this limitation, even if sub-image processor 360 estimates, as the light source, a low color temperature range as in the case of the incandescent lamp, imaging device 10 is capable of preventing the image, in which the skin of the photographer has faded, from being generated.

Note that a method of limiting the WB correction is not limited to a method of limiting the tracking range on the low color temperature side. For the captured image, an image periphery portion, which is less likely to include the face of the photographer, may be weighted, and the light source may be estimated, or alternatively, in analyzing the image data generated by sub-image processor 360, the light source may be estimated without referring to the data on the low color temperature side intentionally. In this way, sub-image processor 360 can be suppressed from estimating the light source on the low color temperature side. Moreover, a limitation on the tracking range of the WB correction is imposed not only on the low color temperature side but also on a high color temperature side, whereby a red fog can also be prevented from being generated on the image.

Next, WB correction 2 is described. In WB correction 2, sub-image processor 360 operates in conjunction with main image processor 160. Controller 180 estimates the light source based on the image data obtained from main camera 100, and notifies sub-image processor 360 of the range, for which the WB correction is performed, based on the estimated light source. For example, in a case where the incandescent lamp is estimated as the light source, then as shown in FIG. 7B, controller 180 notifies sub-image processor 360 of tracking range C1 that is a range for which main image processor 160 performs the WB correction. When main image processor 160 performs the WB correction in tracking range C1, sub-image processor 360 also performs the WB correction in tracking range C2 that is the same range as tracking range C1. By this limitation, imaging device 10 according to this exemplary embodiment can perform a similar WB correction between the image obtained from main image processor 160 and the image obtained from sub-image processor 360. Hence, when the PinP processing is performed, an image with a feeling of strangeness, in which images having different color tones are displayed superimposed on each other, can be suppressed from being generated.

3-2-3. Exposure Correction

Figure 8A:
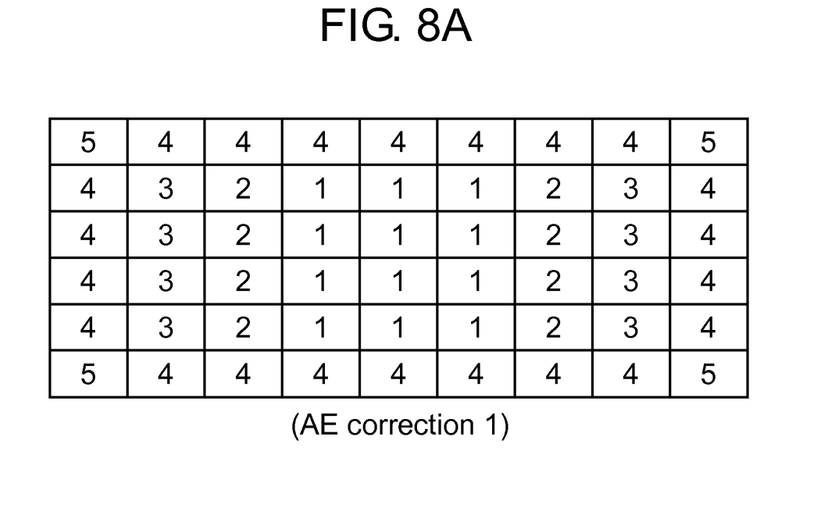
FIG. 8A is a view showing an outline of an exposure correction of the imaging device according to the exemplary embodiment (AE correction 1)
Figure 8B:
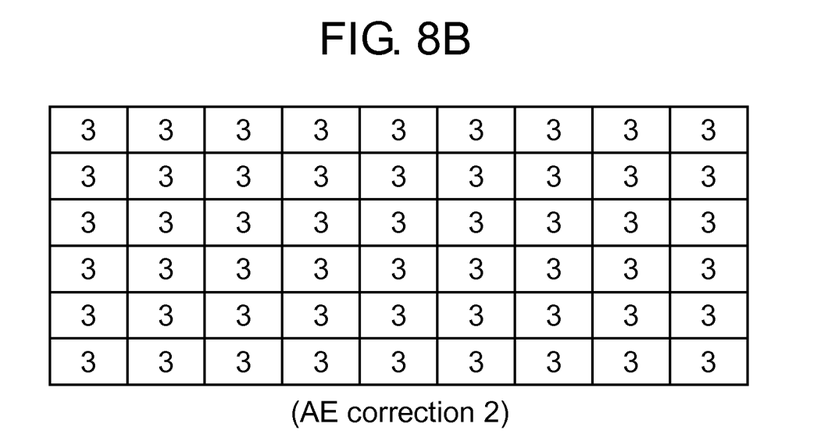
FIG. 8B is a view showing an outline of an exposure correction of the imaging device according to the exemplary embodiment (AE correction 2).

Next, the exposure correction is described. In imaging device 10, different types of an automatic exposure (AE) correction can be performed for sub-image 221 according to the states of sub-camera 300. FIGS. 8A and 8B are views in which weighting is set at photometric spots of the image at the time of the AE correction. In FIG. 8A and FIG. 8B, a spot with a smaller number is weighted more strongly. The details will be described below with reference to FIG. 6B, FIG. 8A, and FIG. 8B.

Figure 6B:
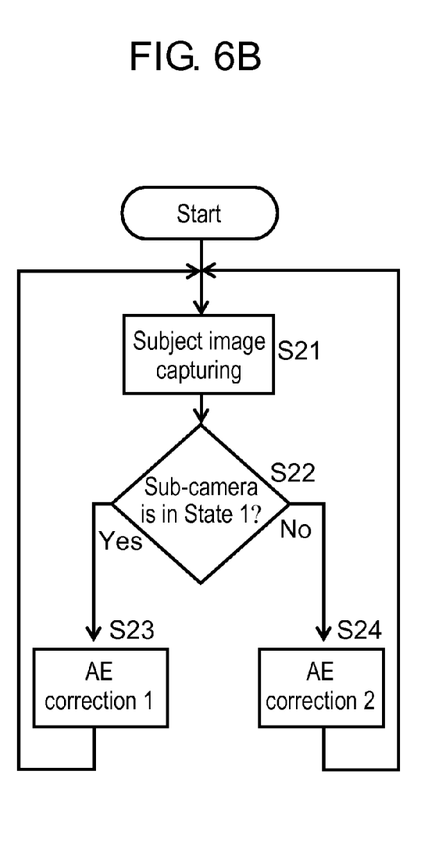
FIG. 6B is a flowchart showing image processing operations of the imaging device according to the exemplary embodiment (AE correction)

In FIG. 6B, the step before Step S22 is similar to the step before Step S12 of FIG. 6A. When sub-camera 300 is in State 1 as a result of sensing the photographing direction (Yes in Step S22), sub-image processor 360 performs, on the image data, AE correction 1 which is suitable for the human face and which enables the face of the photographer to have appropriate brightness (Step S23). When sub-camera 300 is in State 2 (No in Step S22), sub-image processor 360 performs, on the image data generated by sub-camera 300, AE correction 2 which corresponds to the image processing parameter given to the image data generated by main camera 100 (Step S24). Here, AE correction 2, which corresponds to the AE correction for the image data generated by main camera 100, may be a correction by the same parameter as a parameter of the AE correction for the image data generated by main camera 100. Alternatively, AE correction 2 may be a correction by a parameter obtained by multiplying, by a predetermined coefficient, the parameter of the AE correction for the image data generated by main camera 100.

Here, AE correction 1 is described in detail. Controller 180 detects the brightness information of the image data, and performs the AE correction. When sub-camera 300 is in State 1, sub-camera 300 is likely to capture the image of the photographer. Hence, by excessively referring to brightness information of a periphery portion of the image where the face of the photographer is unlikely to be captured, the face of the photographer may become too bright or too dark depending on brightness of a background. However, in such an image, the face of the photographer cannot be expressed as appropriate, and the photographer is likely to feel dissatisfaction.

In this connection, in imaging device 10 according to this exemplary embodiment, when sub-camera 300 is in State 1, a center portion of the photometric range is weighted more strongly as shown in FIG. 8A in order to appropriately express the brightness of the face of the photographer. By this weighting, sub-image processor 360 intensively performs photometry on the center portion of the image, and accordingly, an image with brightness suitable for the face of the photographer can be obtained.

Next, AE correction 2 is described. In AE correction 2, sub-image processor 360 operates in conjunction with main image processor 160. In a case where the photometry is not weighted for main image 222 by the setting of the user, both of main image processor 160 and sub-image processor 360 perform the photometry without weighting specific spots of the images, as shown in FIG. 8B. In this way, imaging device 10 according to this exemplary embodiment can perform a similar AE correction corresponding to the image obtained from main image processor 160 and the image obtained from sub-image processor 360. Hence, when the PinP processing is performed, an image with a feeling of strangeness, in which images having different brightness are displayed superimposed on each other, can be suppressed from being generated.

Note that, at the time of AE correction 2, in a case where the photometry is weighted for main image 222, the photometry may be performed on sub-image 221 without weighting as shown in FIG. 8B. Moreover, the photometry may also be performed on sub-image 221 in a similar way to main image 222 or with sub-image 221 weighted independently.

3-2-4. Sharpness Correction

Finally, the sharpness correction is described. Imaging device 10 can perform different types of the sharpness (SP) correction on sub-image 221 depending on the states of sub-camera 300. The details will be described below with reference to FIG. 6C.

Figure 6C:
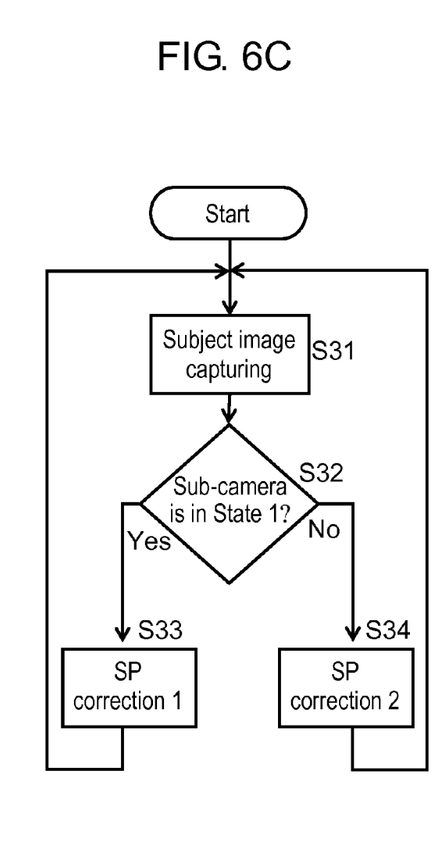
FIG. 6C is a flowchart showing image processing operations of the imaging device according to the exemplary embodiment (SP correction)

In FIG. 6C, the step before Step S32 is similar to the step before Step S12 of FIG. 6A. When sub-camera 300 is in State 1 as a result of sensing the photographing direction (Yes in Step S32), sub-image processor 360 performs, on the image data, SP correction 1 which is suitable for the human face and which prevents an outline and a shadow from being emphasized too much (Step S33). When sub-camera 300 is in State 2 (No in Step S32), sub-image processor 360 performs, on the image data, SP correction 2 which corresponds to main camera 100 (Step S34).

SP correction 1 and SP correction 2 are described. Controller 180 analyzes the brightness difference between the respective pixels of the image data. With regard to SP correction 1, the brightness difference between the respective pixels is reduced so that the outline and the shadow of the face of the photographer are not emphasized too much. In this way, the face of the photographer can be expressed naturally. With regard to SP correction 2, the SP correction corresponding to main image processor 160 is also performed in sub-image processor 360 according to the setting by the user. Here, SP correction 2, which corresponds to the SP correction for the image data generated by main camera 100, may be a correction by the same parameter as a parameter of the SP correction for the image data generated by main camera 100. Alternatively, SP correction 2 may be a correction by a parameter obtained by multiplying, by a predetermined coefficient, the parameter of the SP correction for the image data generated by main camera 100. In this way, imaging device 10 can perform a similar SP correction between the image obtained from main image processor 160 and the image obtained from sub-image processor 360. Hence, when the PinP processing is performed, an image with a feeling of strangeness, in which images having different clearness are displayed superimposed on each other, can be suppressed from being generated.

4. Summary

In this exemplary embodiment, in the imaging device provided with sub-camera 300 which is rotationally movable with respect to main camera 100, the optimum image processing is performed depending on the photographing direction of sub-camera 300, thus making it possible, for example, to appropriately express the face of the photographer, and to photograph the image without a feeling of strangeness at the time of performing the PinP processing.

5. Other Embodiments

Note that, sub-camera 300 is attached to the display unit in this exemplary embodiment; however, the present disclosure is not limited thereto. As long as sub-camera 300 is rotationally movable axially, sub-camera 300 may be attached to a place other than the display unit in the imaging device.

Moreover, in this exemplary embodiment, it is assumed that sub-camera 300 photographs the photographer in State 1, and that sub-camera 300 photographs the subject similar to that of main camera 100 in State 2. However, the present disclosure is not limited thereto. In State 2, a state where sub-camera 300 photographs the photographer may be sensed, and image processing suitable for the human face may be performed. Moreover, in State 1, sub-camera 300 may not photograph the photographer, and the image processing suitable for the human face may not be performed.

Moreover, in this exemplary embodiment, it is assumed that sub-camera 300 has two states, i.e., State 1 and State 2; however, the present disclosure is not limited thereto. For example, sub-camera 300 may have three states, and a state where the photographing direction of main camera 100 and the photographing direction of sub-camera 300 are perpendicular to each other may be assumed as State 3. Then, each image processor only needs to use a setting method of image processing parameters corresponding to the respective states of State 1 to State 3.

Moreover, in this exemplary embodiment, it is assumed that sub-camera 300 rotates uniaxially; however, the present disclosure is not limited thereto. Sub-camera 300 may rotate biaxially or multiaxially. In this way, irrespective of a situation of the rotational movement of the display unit, sub-camera 300 can capture the image of the photographer or the subject similar to that of main camera 100.

Moreover, in this exemplary embodiment, it is assumed that the photographed image data is stored in memory card 200; however, the present disclosure is not limited thereto. The image data may be stored in a different recording medium such as an internal memory.

Moreover, in this exemplary embodiment, main image processor 160 and sub-image processor 360 are described as separate bodies; however, the present disclosure is not limited thereto. Main image processor 160 and sub-image processor 360 may be realized by an integrated image processor having a function of main image processor 160 and a function of a sub-image processor 360.

Moreover, the details of the white balance correction, the exposure correction, and the sharpness correction are not limited to this exemplary embodiment. As long as the setting methods of the image processing parameter, which are different depending on the photographing direction of sub-camera 300, are changed, other image processing can also be applied.

As described above, the exemplary embodiment has been described as exemplification of the technique of the present disclosure. For this purpose, the accompanying drawings and the detailed description are provided.

Hence, the constituents illustrated in the accompanying drawings and described in the detailed description may include not only the constituents which are essential for solving the problems but also the constituents which are not essential for solving the problems, in order to exemplify the above-described technique. Therefore, it should not be immediately recognized that such inessential constituents are essential by the fact that the inessential constituents are illustrated in the accompanying drawings and described in the detailed description.

Moreover, the above-described exemplary embodiment exemplifies the technique in the present disclosure, and accordingly, can be subjected to various types of modifications, substitutions, additions, omissions and the like within the scope of claims or equivalents thereof.

The present disclosure is applicable to a video camera, a digital camera, a cellular phone, and the like.

What is claimed is:

1. An imaging device comprising:
    a first imaging unit that captures an image of a subject and generates first image data;
    a second imaging unit that generates second image data, the second imaging unit being attached so that a photographing direction of the second imaging unit is rotatable with respect to the first imaging unit;
    a detector that detects the photographing direction of the second imaging unit;
    a processor that performs image processing on each of the first image data and the second image data generated by the first imaging unit and the second imaging unit; and
    a controller that changes a setting method of an image processing parameter depending on the photographing direction detected by the detector, the imaging processing parameter being given to the second image data by the processor,
    wherein the detector detects at least a first photographing direction and a second photographing direction,
    the first photographing direction is closer to a photographing direction of the first imaging unit, and the second photographing direction is closer to a photographer's side as compared with the first photographing direction, and the controller sets the image processing parameter given to the second image data using an image processing parameter given to the first image data when the photographing direction detected by the detector is the first photographing direction, and the image processing parameter different from the image processing parameter given to the first image data as the image processing parameter given to the second image data when the photographing direction detected by the detector is the second photographing direction.

2. The imaging device according to claim 1, wherein when the photographing direction detected by the detector is the second photographing direction, the controller uses a setting method of an image processing parameter corresponding to a human face.

3. The imaging device according to claim 2, wherein when the photographing direction detected by the detector is the second photographing direction, the controller uses a setting method of an image processing parameter of limiting a tracking range of a low color temperature side when the processor performs a white balance correction.

4. The imaging device according to claim 2, wherein when the photographing direction detected by the detector is the second photographing direction, the controller uses a setting method of an image processing parameter of performing photometry with larger weight placed on a center portion of an image when the processor performs an exposure correction.

5. The imaging device according to claim 2, wherein when the photographing direction detected by the detector is the second photographing direction, the controller uses a setting method of an image processing parameter of reducing a brightness difference between pixels of the image data.

6. The imaging device according to claim 1, further comprising a display unit, wherein the display unit displays the first image data and the second image data superimposed on each other.

7. The imaging device according to claim 1, wherein the processor includes a first processor that performs image processing on the first image data, and a second processor that performs image processing on the second image data.

8. An imaging device comprising:

a first imaging unit that captures an image of a subject and generates first image data;

a second imaging unit that generates second image data, the second imaging unit being attached so that a photographing direction of the second imaging unit is rotatable with respect to the first imaging unit;

a detector that detects a first photographing direction and a second photographing direction as the photographing direction of the second imaging unit;

a first image processor that performs image processing on the first image data generated by the first imaging unit;

a second image processor that performs image processing on the second image data generated by the second imaging unit; and a controller that sets an operation of the first image processor and the second image processor depending on the photographing direction detected by the detector, wherein the first photographing direction is closer to a photographing direction of the first imaging unit, and the second photographing direction is closer to a photographer's side as compared with the first photographing direction, and the controller operates in conjunction with the first image processor and the second image processor when the photographing direction detected by the detector is the first photographing direction, and independently the first image processor and the second image processor when the photographing direction detected by the detector is the second photographing direction.

9. The imaging device according to claim 8, wherein the controller sets the image processing parameter given to the second image data in conjunction with an image processing parameter given to the first image data when the photographing direction detected by the detector is the first photographing direction, and the image processing parameter given to the second image data independently of an image processing parameter given to the first image data when the photographing direction detected by the detector is the second photographing direction.

10. The imaging device according to claim 8, further comprising a display unit, wherein the display unit displays the first image data and the second image data superimposed on each other.

* * * * *